(12) United States Patent
Song

(10) Patent No.: US 8,289,281 B2
(45) Date of Patent: Oct. 16, 2012

(54) PORTABLE COMPUTER AND CONTROL METHOD THEREOF

(75) Inventor: Jong-ho Song, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1058 days.

(21) Appl. No.: 11/941,269

(22) Filed: Nov. 16, 2007

(65) Prior Publication Data

US 2008/0270114 A1 Oct. 30, 2008

(30) Foreign Application Priority Data

Apr. 25, 2007 (KR) .................. 10-2007-0040443

(51) Int. Cl.
*H03K 17/94* (2006.01)
*H03M 11/00* (2006.01)
(52) U.S. Cl. .............................. 345/169; 341/22
(58) Field of Classification Search .............. 341/22; 345/169
See application file for complete search history.

(56) References Cited

U.S. PATENT DOCUMENTS

| | | | | |
|---|---|---|---|---|
| 5,187,480 A | * | 2/1993 | Thomas et al. | 341/22 |
| 5,499,335 A | * | 3/1996 | Silver et al. | 715/703 |
| 5,903,859 A | * | 5/1999 | Stone et al. | 704/8 |
| 5,914,676 A | * | 6/1999 | Akpa | 341/23 |
| 6,014,616 A | * | 1/2000 | Kim | 704/8 |
| 6,043,760 A | * | 3/2000 | Laakkonen | 341/22 |
| 6,282,712 B1 | * | 8/2001 | Davis et al. | 717/170 |
| 6,546,365 B1 | * | 4/2003 | Gajda et al. | 704/8 |
| 6,615,287 B1 | * | 9/2003 | Behrens et al. | 710/8 |
| 6,922,670 B2 | * | 7/2005 | Yamada et al. | 704/270.1 |
| 7,180,504 B2 | * | 2/2007 | Nathan | 345/168 |
| 7,646,316 B2 | * | 1/2010 | Khoo | 341/22 |

* cited by examiner

*Primary Examiner* — Eric Yen
(74) *Attorney, Agent, or Firm* — Stanzione & Kim, LLP

(57) ABSTRACT

A portable computer operates by an operating system (OS) corresponding to a predetermined language, and includes a keypad unit which includes a plurality of input keys and has a key array corresponding to a plurality of languages, a system unit which operates according to at least one key value, and a control unit which determines the language according to which the OS operates, and controls the system unit to operate according to the key value corresponding to an input key which is selected according to the key array corresponding to the language.

19 Claims, 4 Drawing Sheets

PORTABLE COMPUTER AND CONTROL METHOD THEREOF

CROSS-REFERENCE TO RELATED APPLICATIONS

This application claims priority from Korean Patent Application No. 10-2007-0040443, filed on Apr. 25, 2007 in the Korean Intellectual Property Office, the disclosure of which is incorporated herein in its entirety by reference.

BACKGROUND OF THE INVENTION

1. Field of the Invention

The present general inventive concept relates to a portable computer and a control method thereof, and more particularly, to a portable computer which uses an operating system (OS) according to a predetermined language and a control method thereof.

2. Description of the Related Art

A computer provides various services to a user on the basis of computation and processing of data. A desktop computer installed on a desk is widely supplied and used as a personal computer. However, it is not easy to carry the desktop computer because of its size and weight. Therefore, there is in use a lap-top computer which is of small-size and light-weight with an emphasis on portability, an ultra-mobile personal computer (UMPC) which is still further miniaturized than the lap-top computer and is provided so that a user can hold it using both hands to operate, and others known in the art.

The UMPC type portable computer can surpass a simple multimedia playing device such as a portable multimedia player (PMP) and realize a collective digital activity such as Internet search, documentation, navigation, game and others. To this end, the portable computer includes a keypad which has a plurality of input keys to receive an input.

Generally, for use in each country a keyboard is configured by adding specific national linguistic characters thereon. In this case, having only a basic alphabet cannot properly support keyboard work and operation in various countries. In a general desktop computer, a keyboard array having additional alphabet and special characters added for each country is already determined. However, since the keypad of the portable computer which has a smaller number of the input keys for inputting characters than the desk-top computer cannot accommodate all the keys like the desk-top computer, it is hard to support the languages of all countries. Accordingly, to support a lot of languages in the keypad, each keypad has its own key array configuration because the alphabet and the special characters required for each country, except the English alphabet, cannot be commonly used.

SUMMARY OF THE INVENTION

Accordingly, it is an aspect of the present general inventive concept to provide a portable computer and a control method thereof which can sense an operating language corresponding to an operating system (OS) installed in the portable computer and configure a keypad array to correspond to a keypad provided for the present OS, thus supporting the keypad provided for each language.

Additional aspects and utilities of the present general inventive concept will be set forth in part in the description which follows and, in part, will be obvious from the description, or may be learned by practice of the general inventive concept.

The foregoing and/or other aspects of the present general inventive concept can be achieved by providing a portable computer which operates by an operating system (OS) corresponding to a predetermined language, the portable computer including: a keypad unit which includes a plurality of input keys each having at least one character labeled thereon and has a key array corresponding to a plurality of languages, a system unit to operate according to at least one key value, and a control unit to determine the language according to which the OS operates, and to control the system unit to operate according to the input key value corresponding to an input key which is selected according to the key array corresponding to the determined language.

The portable computer may further include a saving unit to save a table of input key values representing the key array corresponding to the plurality of languages.

The control unit may determine the language according to which the OS operates according to information included in the OS, and controls the system unit to operate according to the input key value corresponding to the selected input key by referring to the key array corresponding to the determined language.

The control unit may determine the language selected by a user, and controls the system unit to operate according to the input key value corresponding to the selected input key by referring to the key array corresponding to the determined language.

The control unit may generate a message to notify a user of the portable computer that the language to which the OS operates has a plurality of characters different than characters printed on the input keys.

The foregoing and/or other aspects of the present general inventive concept can also be achieved by providing a method of controlling a portable computer which operates by an operating system (OS) corresponding to a predetermined language, the method including determining the language according to which the OS operates, assigning an input key value to each of a plurality of input keys, each input key having at least one character printed thereon, by referring to a key array corresponding to the determined language, and operating the portable computer according to the input key value of a selected input key.

The method further includes saving a table of input key values for the key array corresponding to the determined language.

The method further includes saving a table of input key values for the key array corresponding to a plurality of languages.

The method further including generating a message to notify a user of the portable computer that the language to which the OS operates has a plurality of characters different than characters printed on the input keys.

The foregoing and/or other aspects of the present general inventive concept can also be achieved by providing a portable computer including a keypad unit having a plurality of input keys, a system unit to operate an operating system (OS) according to one of a first language and a second language, and a control unit to generate one of a first array of first input key values and a second array of second input key values to be assigned to corresponding ones of the input keys of the keypad unit according to the one of the first language and the second language.

The portable computer wherein the input keys may include character input keys wherein each character input key has associated with it a first input key value to represent an alphabet character of the one of the first language and the second language and a second input key value to represent a special character.

The portable computer wherein the control unit may replace a portion of the one of the first array and the second array with a portion of the other one of the first array and the second array according to the one of the first language and the second language.

The portable computer wherein the control unit may add a specific alphabet character of the one of the first language and the second language to be assigned to a corresponding one the input keys.

The portable computer wherein the plurality of input keys may include at least one input key assigned with an alphabet character and a symbol and the control unit inputs a corresponding input key value for one of the alphabet character and the symbol to the system unit according to a selection of the alphabet character and the symbol.

The portable computer wherein the plurality of input keys may include at least one input key assigned with an alphabet character and a number and the control unit inputs a corresponding input key value for one of the alphabet character and the number to the system unit according to a selection of the alphabet character and the number.

The portable computer wherein the plurality of input keys may include at least one input key assigned with a function and an alphabet character and the control unit inputs a corresponding input key value for one of the function and the alphabet character to the system unit according to the one of the first language and the second language.

The portable computer wherein the control unit may input one of the first input key values and the second input key values which are assigned to one of the input keys to the system unit according to the one of the first language and the second language when one of the input keys is selected.

The foregoing and/or other aspects of the present general inventive concept can also be achieved by providing a method of operating a portable computer including operating an operating system (OS) according to one of a first language and a second language, and generating one of a first array of first input key values and a second array of second input keys values to be assigned to corresponding ones of input keys of a keypad unit according to the one of the first language and the second language.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Figure 1:
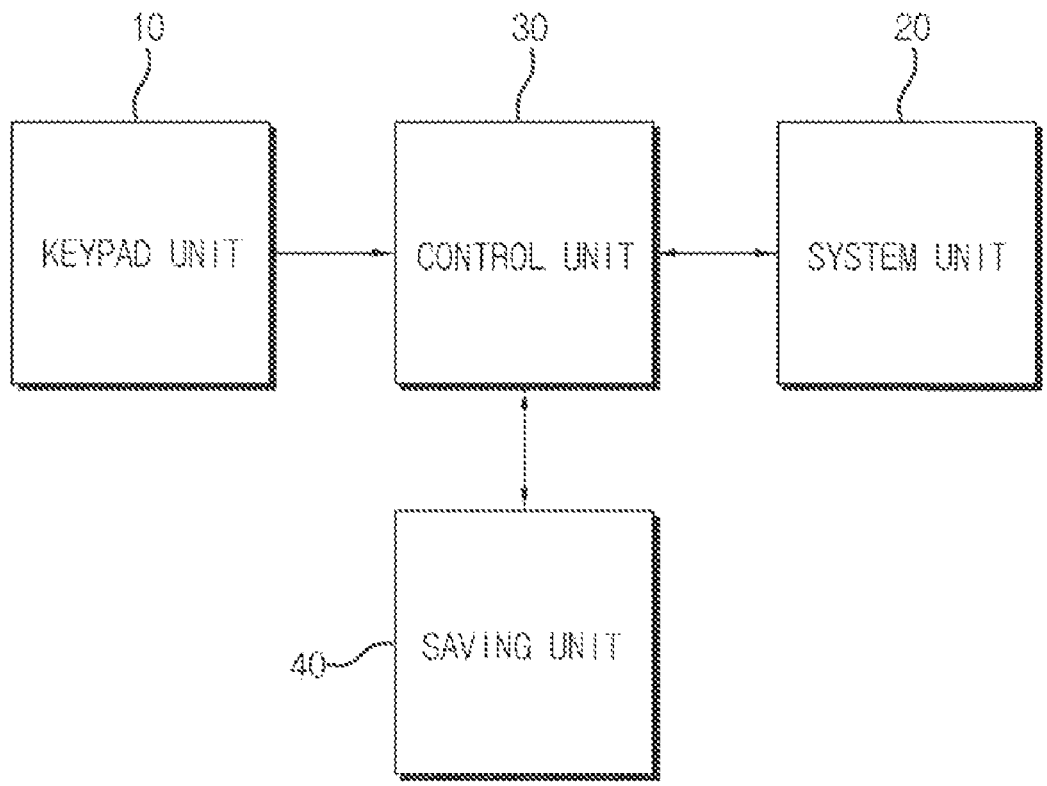
FIG. 1 is a control block diagram of a portable computer according to an exemplary embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As shown in FIG. 1, a portable computer according to an exemplary embodiment of the present general inventive concept includes a keypad unit 10, a system unit 20 a control unit 30, and a saving unit 40.

The keypad unit 10, arranged as a keyboard or keypad, includes a plurality of character buttons, or input keys, 110 (refer to FIGS. 2A and 2B), which are found on a character input keyboard of a general computer interface. In this embodiment, the character input keyboard for the computer interface may be any one of various standard specifications. For example, there are QWERTY type, DVORAK type and AZERTY type character input keyboards for the generally used computer interface. The QWERTY type has a keyboard array of a traditional typewriter and is in general the most widely used keyboard array type. The DVORAK type has been introduced as a substitute for the QWERTY type and has a key arrangement where the frequently used characters in the alphabet can be easily inputted, thus increasing typing speed. The AZERTY type is adopted in some European countries.

The keypad unit 10 is provided to allow convertible input between the alphabet and at least one of the characters other than the alphabet. Various languages may be localized to be adopted for use as the characters other than the alphabet according to the traditional language of countries where the portable computer is used. For example, in case of the portable computer released in Korea, the keypad unit 10 may be provided to allow convertible input between the English alphabet and Hangeul, a Korean language or alphabet.

As described above, the keypad unit 10 is provided to allow inputting special characters in addition to the linguistic or alphabetic characters. Also, the keypad unit 10 includes function input keys 110 known in the art as a "Space" input key, an "Enter" input key, a Hangeul/English conversion input key and others. The special characters and the function input keys 110 may be variously selected and changed to be adopted in consideration of frequency of use by an average user and their function requirements.

Figure 2A:
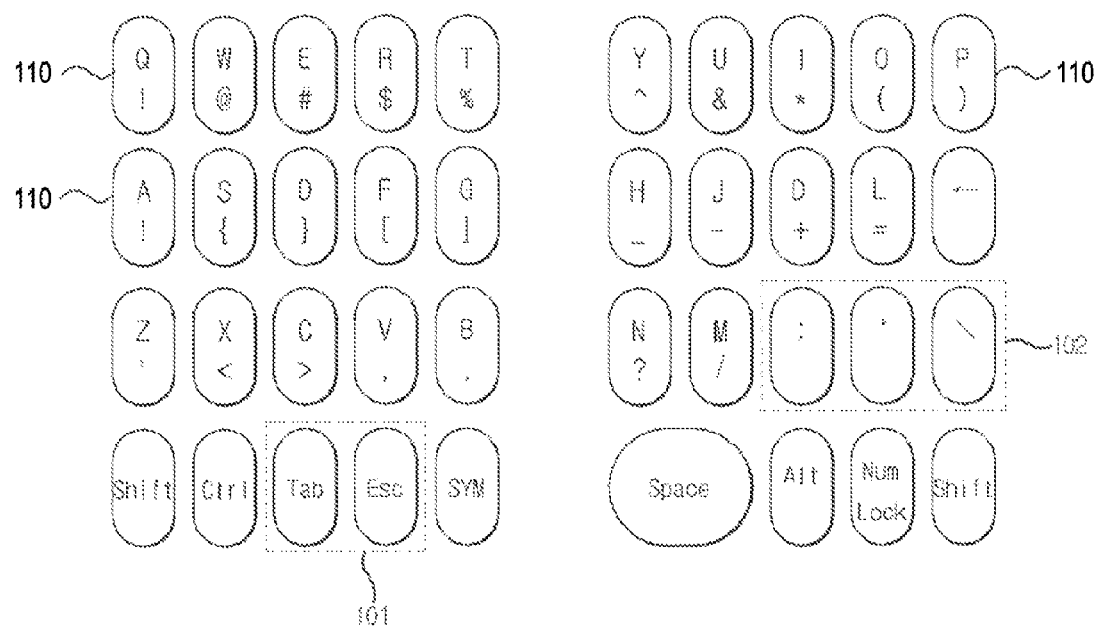
FIGS. 2A and 2B respectively show a keypad arrangement of the portable computer according to an exemplary embodiment of the present general inventive concept.
Figure 2B:
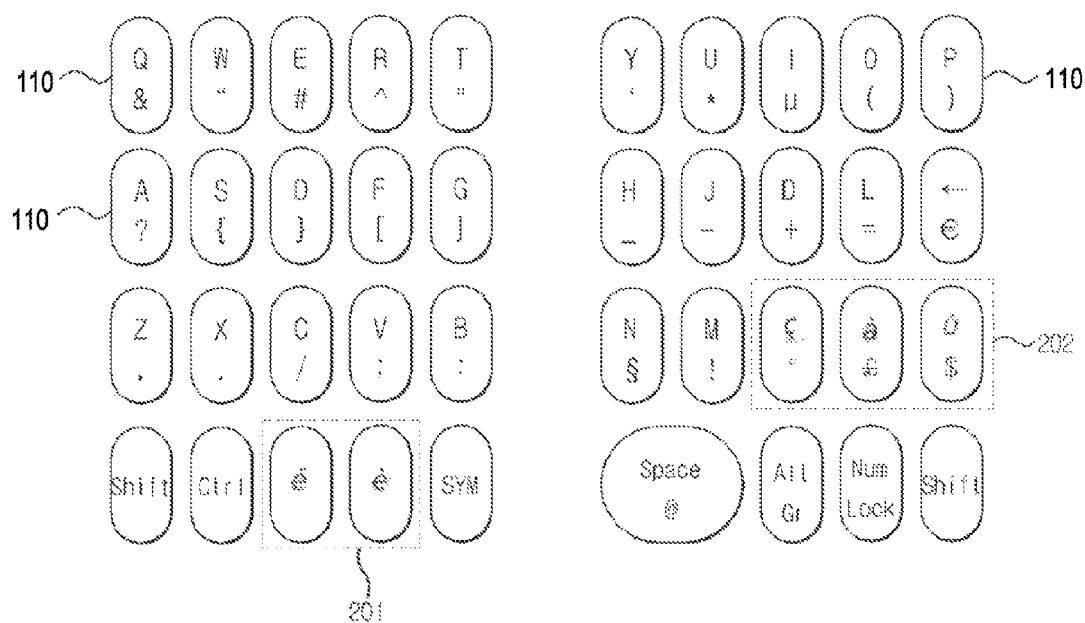

Each input key 110 of keypad unit 10 is printed or otherwise labeled with a function or a character and may also include one or more special characters, as shown in the embodiments of FIGS. 2A and 2B. In general, a character may be an alphabetic character, a symbol or a number. A special character is typically a symbol or a number. To make a selection, a user depresses an input key 110 to select the function or the character printed on the input key 110. To select a special character of an input key 110, the user depresses the input key 110 having the special character in combination with the "Shift" and/or "Alt" input key of the keypad unit 10. An input key value is assigned with each character, special character, or function of associated with an input key 110. Therefore, an input key 110 having more than one type of character or function associated with it has more than one input key value associated with it.

The system unit 20 is operated according to an input value. In this embodiment, the input value may include an input key value assigned to each input key 110.

The control unit 30 controls the system unit 20 to be operated according to the input key value of an input key 110. The control unit 30, according to an exemplary embodiment of the present general inventive concept, may include a central processing unit (CPU), a memory where an operating system (OS) is saved, and a keyboard controller (KBC) which assigns the key value of the input key 110 of the keypad unit 10.

Also, the OS may be saved in an auxiliary memory such as a hard disk drive which is a non-volatile memory.

The portable computer according to an exemplary embodiment of the present general inventive concept may further include a saving unit 40. In this embodiment, a table is provided in the saving unit 40 having an array of input key values of the input keys 110 of the keypad corresponding to the language according to which the OS operates.

In the present embodiment, according to a first language, a first array of input key values is assigned to corresponding ones of input keys 110 of a key pad. According to a second language, a second array of input key values is assigned to corresponding ones of input keys 110 of the key pad. Therefore, each input key 110 may have more than one input key value associated with it corresponding to the input key values according to a selection of languages.

According to an exemplary embodiment of the present general inventive concept, an array of the input keys 110 of a keypad to correspond to an English language OS is shown in FIG. 2A, and an array of the input keys 110 of a keypad to correspond to a French language OS is shown in FIG. 2B. In FIG. 2B, reference numerals 201 and 202 illustrate additional character groups which are required in the French-speaking countries, unlike the keypad array in the English-speaking countries.

Accordingly, by changing the key values of the input keys 110 illustrated in the reference numerals 201 and 202, by changing the key values from a first key value to a second key value, the array of the special characters, which in this example do not include the English language alphabet characters in the keypad, may be different from the character array in the English language OS keypad. Thus, in this example, even though the key values associated with the input keys 110 for the special characters have been changed, the actual labeling of the corresponding input key 110 has not changed. Of course, in general, key values corresponding to alphabet characters for input keys 110 may be changed in the same manner.

The control unit 30 determines the language of the currently operating OS. For example, the control unit 30 may determine an operating language of the currently operating OS according to certain settings or other information included in a predetermined part of the OS installed in the portable computer. In this case, the OS may be embodied by Windows, Linux, MS-DOS or other known operating systems in the art.

For example, if the currently operating OS is the OS corresponding to the English language, the key values of the input key array as shown in FIG. 2A is transmitted to the OS by the control unit 30.

In this embodiment a character value is changed, where if the user selects the far left input key 110 of a character group 101, the control unit 30 controls the system unit 20 so that the far left input key 110 of character group 101 functions as the "Tab" input key which corresponds to the key value of the far left input key 110 of character group 101 according to the English language key array.

However, if the French language OS is installed, the key value of the far left input key 110 of character group 201 corresponds to the "é" input key 110 as shown in FIG. 2B and the control unit 30 controls the system unit 20 for the far left input key 110 to be operated according to the key value of the "é" character.

In the other embodiment, if the English language OS is installed, the far left input key 110 of a character group 102 has the key value of a ";" character (i.e. a semicolon) as shown in FIG. 2A. In this embodiment, if the operating language of the OS is changed to the French language, using the same keypad, and the far left input key 110 of character group 202 is selected (refer to FIG. 2B), the control unit 30 controls the system unit 20 so that the far left input key 110 of the keypad functions as having the key value of the "ç" character according to the stored table. Also, the location of the function of the original ";" input key 110 of the keypad is changed such that the ";" function is now located at the location of the "V" input key 110 located at the third row and fourth column of the left block of input keys 110, as shown in FIG. 2B.

Also, the array of the keypads as shown in FIGS. 2A and 2B may be printed on the keypads of the portable computer according to the OS operating language, respectively. However, if an OS uses a language having characters different than, or requires an array different from, the array of the input keys 110 printed on the keypad, the control unit 30 may inform the user of the need to change the array of the keypad to support the language of the OS by displaying the changed array or a change notification message through a display unit (not shown).

Figure 3:
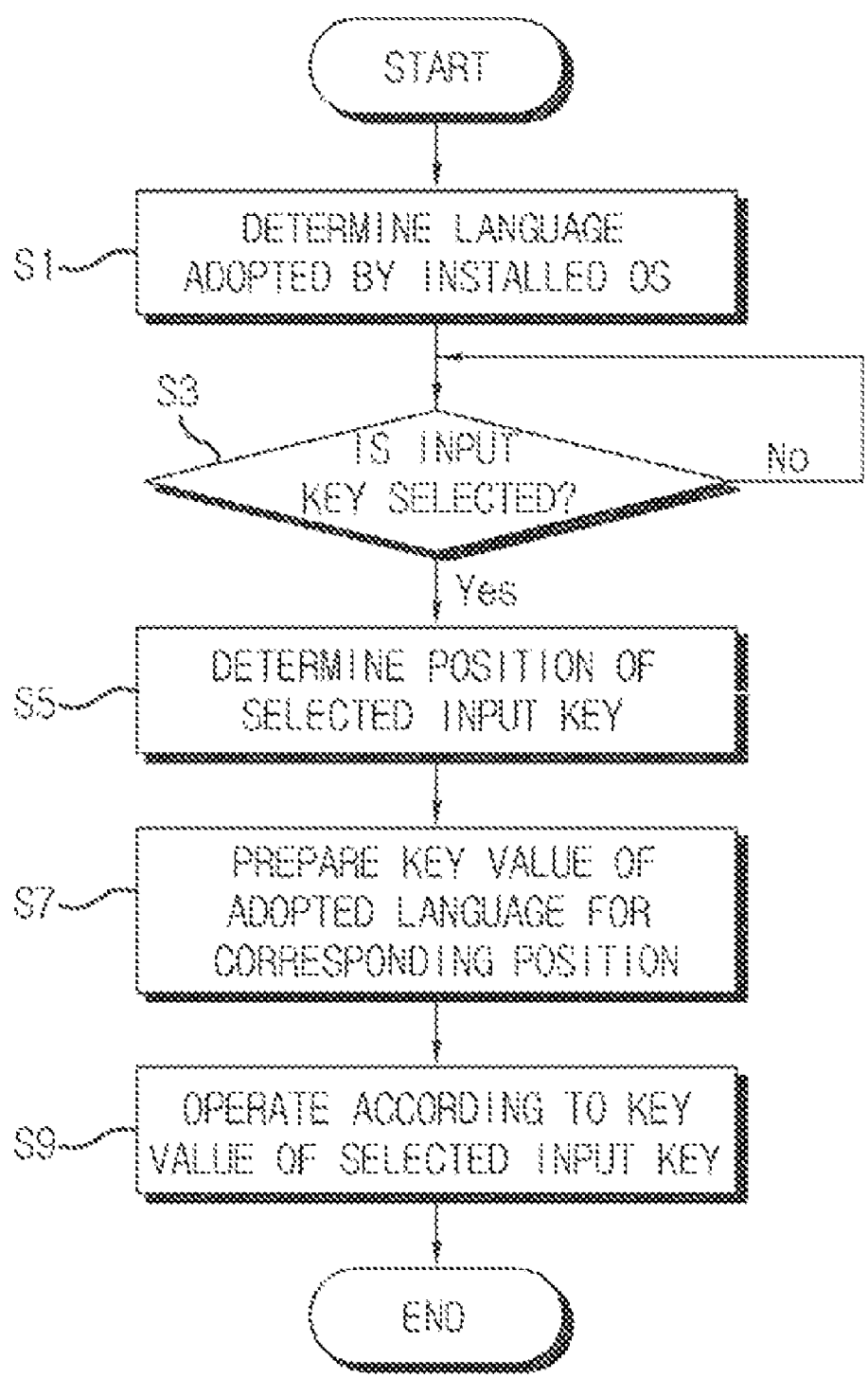
FIG. 3 is a control flow chart of the portable computer according to an exemplary embodiment of the present general inventive concept.

Hereinafter, operating processes of the portable computer according to an exemplary embodiment of the present invention are described in detail with reference to FIG. 3, which is a control flow chart of the portable computer according to an exemplary embodiment of the present general inventive concept.

Firstly, the control unit 30 determines the language according to which the operating system (OS) of the portable computer operates at S1. According to the determination at S1, the control unit 30 transmits the array of the keypad unit 10 corresponding to the operating language to the keyboard controller by referring to the table saved in the saving unit 40.

In this embodiment, if the input key 110 is selected by the user at S3, the control unit 30 determines the position of the selected input key 110 by referring to the table at S5, prepares the key value corresponding to the input key position of the corresponding language at S7, and controls the system unit 20 to operate according to the key value of the selected input key 110 at S9.

In this embodiment, the control unit 30 may determine the operating language of the OS by referring to the settings of the OS. Alternatively, the control unit 30 may receive information from the user that the operating language is changed.

As described hereinbefore, according to the present general inventive concept, a portable computer and control method thereof are provided which can sense the OS operating language installed in the portable computer and configure a keypad array to correspond to the keypad provided to support the present OS, thus supporting the keypad required for each language.

Also, a keypad is provided which has the key array corresponding to the traditional language of each country without an additional change of the keyboard being required by the user if the operating language of the OS in use is changed to a non-traditional language of the country of the user.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A portable computer which operates by an operating system (OS) corresponding to a predetermined language, the portable computer comprising:
   a keypad unit which includes a plurality of input keys each having at least one character labeled thereon and a key array corresponding to a plurality of languages;
   a system unit to operate according to at least one input key value; and
   a control unit to automatically identify the predetermined language of the currently operating OS, and to control the system unit to operate according to the input key value corresponding to an input key that has been selected from among a first plurality of input keys according to the key array corresponding to the identified predetermined language of the currently operating OS,
   wherein at least one first input key among the first plurality of input keys is assigned a non-alphanumeric function for a first determined language, and the non-alphanumeric function of the first input key is changed to a character in response to changing the predetermined language to a second language.

2. The portable computer according to claim 1, further comprising: a saving unit to save a table of input key values representing the key array corresponding to the plurality of languages.

3. The portable computer according to claim 2, wherein the control unit identifies the predetermined language according to which the OS operates according to information included in the OS, and controls the system unit to operate according to the input key value corresponding to the selected input key by referring to the key array corresponding to the identified predetermined language to which the OS operates.

4. The portable computer according to claim 2, wherein the control unit also determines a language that has been selected from the plurality of languages by a user, and controls the system unit to operate according to the input key value corresponding to the selected input key by referring to the key array corresponding to the determined language.

5. The portable computer according to claim 2, wherein the control unit generates a message to notify a user of the portable computer that the predetermined language to which the OS operates has a plurality of characters different than characters labeled on the input keys.

6. A method of controlling a portable computer which operates by an operating system (OS) corresponding to a predetermined language, the method comprising:
   automatically identifying the predetermined language of the currently operating OS;
   assigning an input key value to each of a plurality of input keys, each input key having at least one character printed thereon to input the printed character, by referring to a key array corresponding to the identified predetermined language of the currently operating OS;
   assigning a non-alphanumeric function to at least one of the input keys having the printed character in response to determining the predetermined language of the currently operating OS is change to a different language; and
   operating the portable computer according to the non-alphanumeric function assigned to the changed input key value of a selected input key.

7. The method of claim 6, further comprising: saving a table of input key values for the key array corresponding to the identified predetermined language.

8. The method of claim 6, further comprising: saving a table of input key values for the key array corresponding to a plurality of languages.

9. The method of claim 6, further comprising: generating a message to notify a user of the portable computer that the predetermined language to which the OS operates has a plurality of characters different than characters printed on the input keys.

10. A portable computer, comprising:
    a keypad unit having a plurality of input keys;
    a system unit to operate an operating system (OS) according to one of a first language and a second language; and
    a control unit to generate one of a first array of first input key values and a second array of second input key values to be assigned to corresponding ones of the input keys of the keypad unit according to the one of the first language and the second language, wherein the control unit replaces a portion of the one of the first array and the second array with a portion of the other one of the first array and the second array according to the one of the first language and the second language while maintaining a remainder of the one of the first array and the second array,
    wherein at least one input key value of the of the first input key values is assigned a non-alphanumeric function corresponding to the first language, and the non-alphanumeric function of the first input key is changed to a character corresponding to the second language.

11. The portable computer of claim 10, wherein the input keys include character input keys wherein each character input key has associated with it a first input key value to represent an alphabet character of the one of the first language and the second language and a second input key value to represent a special character.

12. The portable computer of claim 10, wherein the control unit adds a specific alphabet character of the one of the first language and the second language to be assigned to a corresponding one of the input keys.

13. The portable computer of claim 10, wherein the plurality of input keys comprise at least one input key assigned with an alphabet character and a symbol, and the control unit inputs a corresponding input key value for one of the alphabet character and the symbol to the system unit according to a selection of the alphabet character and the symbol.

14. The portable computer of claim 10, wherein the plurality of input keys comprise at least one input key assigned with an alphabet character and a number, and the control unit inputs a corresponding input key value for one of the alphabet character and the number to the system unit according to the one of the first language and the second language.

15. The portable computer of claim 10, wherein the plurality of input keys comprise at least one input key assigned with a function and an alphabet character, and the control unit inputs a corresponding input key value for one of the function and the alphabet character to the system unit according to the one of the first language and the second language.

16. The portable computer of claim 10, wherein the control unit inputs one of the first input key values and the second input key values which are assigned to one of the input keys to the system unit according to the one of the first language and the second language when one of the input keys is selected.

17. A method of operating a portable computer, the method comprising:
   operating an operating system (OS) according to one of a first language and a second language;
   generating one of a first array of first input key values and a second array of second input key values to be assigned to corresponding ones of input keys of a keypad unit according to the one of the first language and the second language; and
   replacing a portion of the one of the first array of first input key values and the second array of second input key values with a portion of the other one of the first array of first input key values and the second array of second input key values according to the one of the first language and the second language while maintaining a remainder of the one of the first array and the second array,
   wherein at least one input key value of the of the first input key values is assigned a non-alphanumeric function corresponding to the first language, and the non-alphanumeric function of the first input key is changed to a character corresponding to the second language.

18. A portable computer, the portable computer comprising:
   a system unit installed with an operating system;
   a keypad unit that includes a plurality of input keys each having at least one character labeled thereon, and at least one input key value arranged according to a key array corresponding to a predetermined language of the installed operating system and a user-selected language; and
   a control unit to automatically determine the at least one input key value according to the predetermined language of the installed operating system and according to the user-selected language, and to control the system unit to operate according to the at least one input key value corresponding to an input key that has been selected from among the plurality of input keys according to the key array corresponding to the predetermined language of the installed operating system and the user-selected language,
   wherein at least one first input key among the plurality of input keys is assigned a non-alphanumeric function for a first determined language, and the non-alphanumeric function of the first input key is changed to a character in response to changing the predetermined language to a second language.

19. A portable computer which operates by an operating system (OS) corresponding to a predetermined language, the portable computer comprising:
   a keypad unit that includes a plurality of input keys each having at least one character labeled thereon and a key array corresponding to a plurality of languages;
   a system unit to operate according to at least one input key value; and
   a control unit to automatically identify the predetermined language to which the OS operates, and to control the system unit to operate according to the input key value corresponding to an input key that has been selected from among the plurality of input keys according to the key array corresponding to the identified predetermined language to which the OS operates, wherein the input key value of the input key is assigned a non-alphanumeric function for a first determined language, and the non-alphanumeric function of the input key is changed to a character for a second determined language.

* * * * *